(12) United States Patent
De Bruijne

(10) Patent No.: US 6,944,392 B1
(45) Date of Patent: Sep. 13, 2005

(54) ELECTRONIC DEVICE

(75) Inventor: Roeland Pieter De Bruijne, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 938 days.

(21) Appl. No.: 09/671,914

(22) Filed: Sep. 28, 2000

(30) Foreign Application Priority Data

Sep. 30, 1999 (DE) .................... 199 46 818

(51) Int. Cl.[7] ............... H04N 5/85; H04N 5/91
(52) U.S. Cl. ........................... 386/125; 386/46
(58) Field of Search ................. 386/125, 124, 386/126, 105, 106, 46, 45, 40, 94, 92, 1, 386/4, 52; 360/13, 15, 32

(56) References Cited

U.S. PATENT DOCUMENTS 5,631,882 A * 5/1997 Mascenik .......... 369/30.32
6,452,893 B1 * 9/2002 Wahl .............. 369/178.01
6,490,238 B1 * 12/2002 Begley et al. ........ 369/75.2

* cited by examiner

*Primary Examiner*—Robert Chevalier
(74) *Attorney, Agent, or Firm*—Michael E. Belk

(57) ABSTRACT

The invention relates to an electronic device with an optical unit for reading information stored on an information plate and for writing information on an information plate, characterized in that the electronic device comprises a transport mechanism for the transport of at least two information plates between a storage position and a playing position provided both for reading and for writing, in that a memory unit is provided for the intermediate storage of information, and in that an alternate transport of the first and of the second information plate between the playing position and the respective storage position is provided for the purpose of copying information from a first information plate to a second information plate, such that alternatively in a first time interval a read-out of information from the first information plate and an intermediate storage of this read-out information in the memory unit are carried out, and in a second time interval the information stored in said memory unit is written onto the second information plate.

18 Claims, 1 Drawing Sheet

ELECTRONIC DEVICE

Figure 1A:
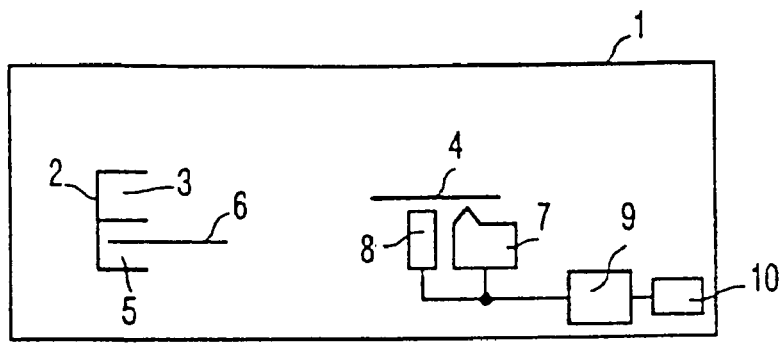

The invention relates to an electronic device with an optical unit for reading information stored on an information plate and for writing information on an information plate.

Such a device is known, for example, from the Philips CD Recorder CDR765. This known device comprises two complete drive units. To copy information from a first information plate onto a second information plate, the information is read out from the first information plate by means of the one drive unit and written on the second information plate by means of the second drive unit in the known device. The known device is comparatively expensive because of the two complete drive units which each comprise a turntable 1, a turntable drive, and an optical laser unit.

The information plates referred to are optical storage discs, in particular Compact Discs (CD), Compact Discs Recordable (CDR), Compact Discs Rewritable (CD-RW), Digital Video Discs (DVD), Video CD (VCD), Super Video CD (SVCD), DVD-R, DVD-RAM, and DVD R/W.

It is an object of the invention to provide an inexpensive device of the kind mentioned in the opening paragraph which renders possible copying of information from one information plate to another information plate.

According to the invention, this object is achieved in that the electronic device comprises a transport mechanism for the transport of at least two information plates between a storage position and a playing position provided both for reading and for writing, in that a memory unit is provided for the intermediate storage of information, and in that an alternate transport of the first and of the second information plate between the playing position and the respective storage position is provided for the purpose of copying information from a first information plate to a second information plate, such that alternately in a first time interval a read-out of information from the first information plate and an intermediate storage of this read-out information in the memory unit are carried out, and in a second time interval the information stored in said memory unit is written onto the second information plate.

The device according to the invention represents an inexpensive solution because only a single drive unit is required. The transport mechanism for transporting the information plates between the playing position and the storage positions can be realized in a simple and inexpensive manner.

In particular, the device may at the same time be operated as a normal CD/DVD/VCD changer for the alternate playback of two or more information plates. The storage positions referred to are positions of the information plate which are not provided for the playback or writing of the information plates. The information plates which are not required for playback and/or writing at any moment are shunted into the storage positions and are transported from the storage positions into the playing position when required for reading or writing.

The transport mechanism for the information plates may be realized in a wide variety of manners. In particular, sliding members, transport belts, or rollers acting on the plate edge may be used for the transport of the information plates. A further advantageous possibility for transporting the information plates is formed by movable storage compartments.

In particular, constructions known from CD changers may be used for the transport mechanism.

A further advantageous changer construction is found in carrousel changers which comprise in particular storage compartments (trays) arranged in a circle. The carrousel is rotated for playing or writing an information plate, and the desired information plate is located above the turntable of the optical unit. A clamping mechanism then lifts the information plate from the storage compartment and drives it into rotation for the purpose of reading or writing.

In the advantageous embodiment of the invention as defined in claim 2, the electronic device is a video recorder for the playback of video information stored on information plates. Video recorders often already have a data storage unit of high memory capacity so as to enable a simultaneous recording and playback operation. This memory unit already present may advantageously also serve for the intermediate storage of the data during copying of the information plates.

Particularly suitable information plates for the storage of video information are Digital Video Discs (DVD), Video CDs (VCD), Super Video CDs (SVCD), DVD-Rs, DVD-RAMs, and DVD R/Ws. The data are stored in sectors, each having a sector header, on such information plates. It is possible in a particularly simple manner by means of the sector headers to position the optical unit, i.e. the laser, in the desired writing or reading position.

In the advantageous embodiment of the invention as defined in claim 3, the electronic device is an audio disc recorder.

Audio disc recorders are often already fitted with a changer mechanism for the alternate playback of information plates. It is possible to realize an inexpensive audio disc recorder with a copying function by means of an additional memory unit for the intermediate storage of information.

In the advantageous embodiment of the invention as defined in claim 4, a multiple copy of an information plate is manufactured within one copying cycle, i.e. within the alternate writing and reading cycle. For example, if a first information plate is the information plate to be copied, and a second and a third information plate are to be inscribed with the information to be copied from the first information plate, then part of the information stored on the first information plate is first read out in a first time interval and written into the memory unit. Then, in a second time interval, the information stored in the memory unit is written onto the second information plate, and in a third time interval the information stored in the memory unit is written onto the third information plate.

This cycle is repeated as often as is necessary.

Figure 1B:
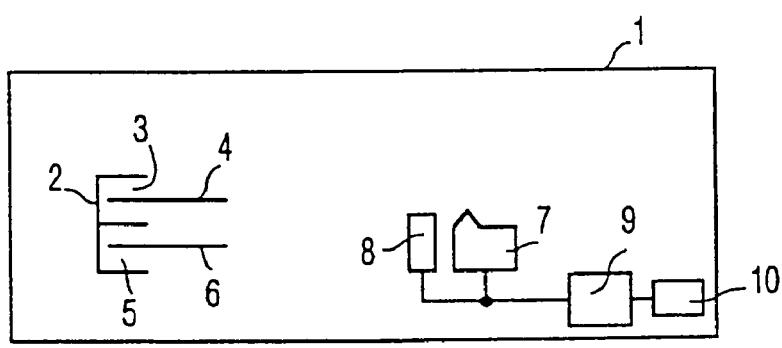
Figure 1C:
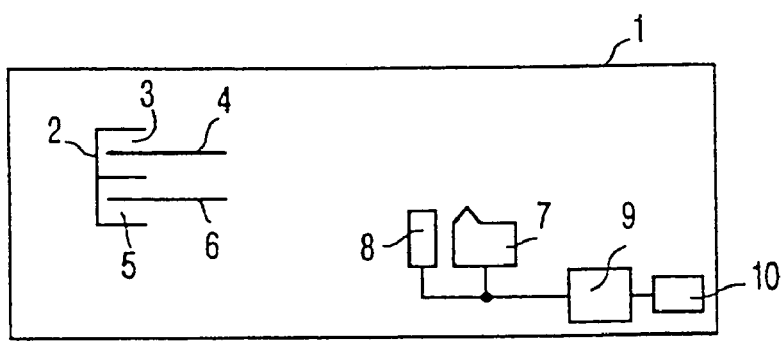
Figure 1D:
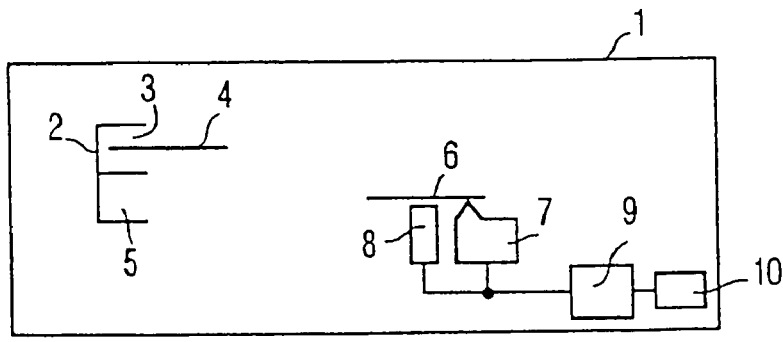

An embodiment of the invention will now be explained in more detail below with reference to the drawing comprising FIGS. 1a to 1d, in which:

FIG. 1a is a diagrammatic representation of an electronic device with an optical unit for reading information stored on an information plate and for writing information onto an information plate, in which a first information plate is in a playing position and a second information plate is in a storage position in a storage magazine, FIG. 1b shows the electronic device of FIG. 1a, with the first information plate having been transported from the playing position into a transfer position within the storage magazine, FIG. 1c shows the electronic device of FIG. 1b, in which the storage magazine has been moved vertically upwards, while the second information plate is in the transfer position, and FIG. 1d shows the electronic device of FIG. 1c, where the second information plate has been transported from the transfer position into the playing position.

FIGS. 1 to 1d diagrammatically show the time sequence of a copying process of information stored on a first information plate 4 onto a second information plate 6.

The electronic device of FIG. 1a comprises a housing 1. A storage compartment 2 is arranged in the housing 1 and is movable in the vertical Z-direction by means of a first transport mechanism which is not shown in any detail. The first transport mechanism for the storage compartment may be realized, for example, by means of a rotatable spindle. Such a transport mechanism is described in detail, for example, in DE 4404006 A1. The storage magazine 2 comprises a first storage compartment 3 for the first information plate 4 and a second storage compartment 5 for the second information plate 6. An optical unit 7 and a turntable motor 8 are provided for playing and writing the information plates. The optical unit 7 and the turntable motor 8 are coupled to a control circuit 9. The control circuit 9 is further coupled to a memory unit 10.

The control circuit 9 is designed for controlling the turntable motor 8, the optical unit 7, and the memory unit 10.

In FIG. 1a, the first information plate 4 is in a playing position on a turntable (not shown in any detail) associated with the turntable motor 8 and is driven into rotation by the latter. The storage magazine 2 is vertically positioned such that the first storage compartment 3 is in a transfer position, and the second storage compartment 5 with the second information plate 6 is in a storage position. The transfer position is that position in which the respective storage compartment is approximately at the same vertical level as the turntable of the turntable motor 8, so that a substantially horizontal transport of the respective information plate between the playing position and the transfer position is possible by means of a second transport mechanism which is not shown in any detail.

The second transport mechanism may be realized by means of various transport mechanisms which are not shown in detail. A particularly simple possibility is formed by sliding members which are movable in the X-direction and which press against the plate edge of the information plate which is to be transported.

A programmable quantity of data is read out from the first information plate 4 present in the playing position and put in intermediate storage in the memory unit 10 by means of the optical unit 7 in a first time interval. The quantity of data which can be read out is limited by the memory capacity of the memory unit 10.

In FIG. 1b, the storage magazine 2 is in the same position as in FIG. 1c, i.e. the first storage compartment 3 is in the transfer position. The first information plate 4 is now in the first storage compartment 3 of the storage magazine 4. The second transport mechanism, which is not shown in any detail, is provided for the transport of the information plate 4 from the playing position shown in FIG. 1a to the transfer position shown in FIG. 1b.

In FIG. 1c, the storage magazine 2 has been vertically shifted upwards, in the positive Z-direction, by means of the first transport mechanism, so that the second storage compartment 5, in which the second information plate 6 is present, is in the transfer position now. The first storage compartment 3 with the first information plate 4 is in a storage position.

In FIG. 1d, the storage magazine 2 is again in the same position as in FIG. 1c, i.e. the second storage compartment 5 is in the transfer position. The second information plate 6 has been transported from the transfer position into the playing position by the second transport mechanism and accordingly lies on the turntable (not shown) of the turntable motor 8.

The information stored in the memory unit 10 is read out from the memory unit 10, controlled by the control circuit 9, and written onto the second information plate 6 by the optical unit 7.

The copying process shown in FIGS. 1a to 1d may be repeated as often as desired, so that the total quantity of data stored on the first information plate 4 can be copied onto the second information plate 6. The number of repetitions of the cycle shown in FIGS. 1a to 1d necessary for a complete copying depends in particular on the memory capacity of the memory unit 10.

The storage magazine 2 may preferably also be designed for holding three or more information plates. Such a device renders possible not only the copying function described above but also an alternating playback of the information plates. It is in addition possible to manufacture a plurality of copies of an information plate during one copying cycle.

What is claimed is:

1. An electronic device with an optical unit for reading information stored on an information plate and for writing information on an information plate, characterized in that the electronic device comprises a transport mechanism for the transport of information plates between a transfer position and a playing position provided both for reading and for writing, in that a memory unit is provided for the intermediate storage of information, and an alternate transport mechanism that can alternately move the information plates between the transfer position and a storage position, wherein at least two separate storage compartments are provided for information plates that are placed in the transfer position and the storage position, wherein the electronic device is designed for the transport of at least three information plates between the storage positions and the playing position, and in that the device is designed for the manufacture of a plurality of copies of an information plate to be copied within one copying cycle.

2. An electronic device as claimed in claim 1, characterized in that the electronic device is a video recorder for the playback and/or writing of information carriers on which video data are stored, in particular information carriers in accordance with the DVD standard, the VCD standard, the SVCD standard, the DVD-R standard, the DVD-RAM standard, and the DVD R/W standard.

3. An electronic device as claimed in claim 1, characterized in that the electronic device is an audio recorder for the playback and/or writing of information carriers on which audio data are stored, in particular information carriers in accordance with CD-R or CD-RW standard.

4. An electronic device as claimed in claim 1, characterized in that the electronic device is provided for the purpose of copying information from a first information plate to a second information plate.

5. An electronic device as claimed in claim 4, characterized in that the electronic device is provided for the purpose of alternatively in a first time interval information read from the first information plate into the intermediate storage of the memory unit, and in a second time interval the intermediate storage of information stored in the memory unit is written onto the second information plate.

6. An electronic device as claimed in claim 1, characterized in that the alternate transport mechanism moves the separate compartments between the transfer position and the storage position.

7. An electronic device as claimed in claim 6, characterized in that the transfer mechanism moves information plates between the playing position and the transfer position, the alternate transfer mechanism moves information plates between the transfer position and the storage position, allowing for information to be exchanged between information plates by placing information from a first information into the intermediate storage, alternating information plates in the playing position placing and placing information in the intermediate storage onto a second information plate.

8. An electronic device as claimed in claim 1, characterized in that the transfer mechanism moves information plates between the playing position and the transfer position, the alternate transfer mechanism moves information plates between the transfer position and the storage position, such that a first information plate is moved by the transfer mechanism from the playing position into the transfer position and the alternate transfer mechanism moves the first information plate from a transfer position into the storage position and moves a second information plate from the storage position into the transfer position allowing the transfer mechanism to place the second information plate into the playing position so that information can be exchanged from the first information into the intermediate storage, alternating information plates in the playing position placing information in the intermediate stage on the second information plate.

9. An electronic device as claimed in claim 1, characterized in that the transfer mechanism moves a first information plate from one of the compartments into the playing position so that the first information plate can be read by the optical unit and data read stored in the intermediate storage, the transfer mechanism then moves the first information plate from the playing position to the transfer position, the alternate transfer mechanism moves the first information plate between the transfer position and the storage position and places a second information plate from the storage position into transfer position, the transfer mechanism moves the second information plate into the playing position so that information within the intermediate storage can be placed onto the second information plate.

10. An electronic device with an optical unit for reading information stored on information plates and for writing information on information plates, the electronic device comprising:
   a storage magazine having at least two storage compartments with each compartment capable of holding an information plate;
   a transport mechanism that moves the information plate between a transfer position and a play position, wherein the optical unit can perform read/write operations on the information plate in the play position;
   an alternate sport mechanism that moves information plates while within their respective storage compartment between a storage position and the transfer position; and
   a memory unit operatively coupled to the optical unit having an intermediate storage for information received from read/write operations of the optical unit;
   wherein the electronic device is designed for the transport of at least three information plates between the storage positions and the playing position, and in that the device is designed for the manufacture of a plurality of copies of a information plate to be copied within one copying cycle.

11. An electronic device as claimed in claim 10, characterized in that the electronic device is a video recorder for the playback and/or writing of information carriers on which video data are stored, in particular information carriers in accordance with the DVD standard, the VCD standard, the SVCD standard, the DVD-R standard, the DVD-RAM standard, and the DVD R/W standard.

12. An electronic device as claimed in claim 10, characterized in that the electronic device is an audio recorder for the playback and/or writing of information carriers on which audio data are stored, in particular information carriers in accordance with CD-R or CD-RW standard.

13. An electronic device as claimed in claim 10, characterized in that the electronic device is provided for the purpose of copying information from a first information plate to a second information plate.

14. An electronic device as claimed in claim 13, characterized in that the electronic device is provided for the purpose of alternatively in a first time interval information read from the first information plate into the intermediate storage of the memory unit, and in a second time interval the intermediate storage of information stored in the memory unit is written onto the second information plate.

15. An electronic device as claimed in claim 10, characterized in that the alternate transport mechanism moves the separate compartments between the transfer position and the storage position.

16. An electronic device as claimed in claim 15, characterized in that the transfer mechanism moves information plates between the playing position and the transfer position, the alternate transfer mechanism moves information plates between the transfer position and the storage position, allowing for information to be exchanged between information plates by placing information from a first information into the intermediate storage, alternating information plates in the playing position placing and placing information in the intermediate storage onto a second information plate.

17. An electronic device as claimed in claim 10, characterized in that the transfer mechanism moves information plates between the playing position and the transfer position, the alternate transfer mechanism moves information plates between the transfer position and the storage position, such that a first information plate is moved by the transfer mechanism from the playing position into the transfer position and the alternate transfer mechanism moves the first information plate from a transfer position into the storage position and moves a second information plate from the storage position into the transfer position allowing the transfer mechanism to place the second information plate into the playing position so that information can be exchanged from the first information into the intermediate storage, alternating information plates in the playing position placing information in the intermediate storage on the second information plate.

18. An electronic device as claimed in claim 10, characterized in that the transfer mechanism moves a first information plate from one of the compartments into the playing position so that the first information plate can be read by the optical unit and data read stored in the intermediate storage, the transfer mechanism then moves the first information plate from the playing position to the transfer position, the alternate transfer mechanism moves first information plate between the transfer position and the storage position and places a second information plate from the storage position into transfer position, the transfer mechanism moves the second information plate into the playing position so that information within the intermediate storage can be placed onto the second information plate.

* * * * *